UNITED STATES PATENT OFFICE.

JOHN LOUIS JULLION, OF ABERDEEN, GREAT BRITAIN.

IMPROVEMENT IN THE PREPARATION OF PAPER.

Specification forming part of Letters Patent No. 28,182, dated May 8, 1860.

*To all whom it may concern:*

Be it known that I, JOHN LOUIS JULLION, of Aberdeen, Great Britain, have invented Improvements in the Manufacture of Paper; and I do hereby declare that the following is a full and exact description—that is to say:

My invention consists in a method or methods of filling up with a substance of light specific gravity the interstices of the fibers composing paper, so as to consolidate and harden the same. To effect this object I make use of compounds of the metals, aluminium, calcium, magnesium, and silicium, either in the metallic or oxidized state, and the acids I combine with these bases to produce a substance suitable to my purpose are commonly known to chemists as "sulphuric," "fluoric," "fluosilicic," and "silicic;" but I employ only such combinations of these bodies as are sparingly soluble or nearly insoluble in water. When silicic acid is used a base is not absolutely requisite, as that substance alone, when artificially prepared, furnishes a body well suited to my purpose. In all cases it is absolutely essential, in the first instance, that the ingredients be dissolved, so as to admit of purification. This being done and desired combination made between the earthy materials, (or in the case of silicic acid its separation effected,) the resulting product has to be thoroughly washed with water to remove all foreign substances. I next take the compound thus formed and mix it with any description of farinaceous or other matter of a glutinous nature in solution, and when the earthy body is well incorporated with such substance I add chloride or oxychloride of zinc in sufficient quantity to precipitate from its state of solution the whole of the organic compound—that is to say, I first prepare the earthy matter by any of the ordinary means that are described and set forth in the generality of works on chemistry. These may consist of the sulphates, silicates, fluosilicates, or fluorides of the earthy bodies, and I prefer the compound of lime with sulphuric acid, known as "sulphate of lime." This may be prepared by dissolving fifty-six pounds, weight, of chloride of calcium in one hundred gallons of water in a suitable vessel, and in another such vessel seventy-two pounds, weight, of dry sulphate of soda in a like quantity of water. The solutions, after a careful filtration, are to be mixed together, and the resulting precipitate washed with clean water until it is tasteless, after which it is ready for use; but any combination of the before-mentioned elements or mixture of combinations that are or may be known to chemists, formed of such constituents, can be used with equal success; and I next take one pound, weight, of starch, dextrine, gum, rosin, or other matter of a glutinous nature, and having dissolved it in an alkaline lye or in plain water and carefully filtered the solution by any known means, I mix therewith six or eight ounces of chloride of zinc, or the same weight of chloride and oxide of zinc mixed together, and when the same is well incorporated with the precipitated organic matter and thoroughly washed with a plentiful supply of water to cleanse and purify it, I cause the resulting product to be mixed in the rag-engine or otherwise with the paper-pulp in the proportion of about thirty pounds, weight, of the chemical preparation to each hundred pounds, weight, of rag or other pulp.

Various proportions of chemical matter and pulp may be used to suit the different kinds of paper that are made, and it will be found advantageous to adjust the relative ratio of the earthy and organic chemical ingredients to the quality of paper required, so that it may be more or less sized when first dried. This will be better understood by paper-makers when I say that in papers that are intended to be sized with gelatine or other glutinous size after they have been partially or wholly dried the organic matter may be used in a relatively small quantity to the earthy substances, or entirely omitted, whereas in papers that are intended to be engine-sized, and this process only is used to effect that object, the reverse must be the case.

In illustration of this I mention that a hard well-closed paper may be made by using the earthy constituents alone with the pulp; or a hard well-sized paper may be made by using the precipitated organic matter the same way; or any degree between these two may be produced by mixing the ingredients in such proportions as to produce the desired result. The purified earthy compound with the solution of organic matter, or the latter substance alone, can be added to the paper-pulp, and the zinc compound mixed afterward as engine size.

The pulp containing the organic and chemical bodies may be made into paper, and the zinc salt used in the ordinary way as a sizing agent; or the paper may be made in any usual manner and sized with the mixture of glutinous matter combined with chloride or oxychloride of zinc in place of gelatine or other size.

For the finer kinds of papers, that are sized with glutinous substances after they are made, the first or before-mentioned part of my process may be used; and, secondly, I mix a large proportion of inorganic matter with the glutinous substance used as a sizing agent, and I prefer prepared silicic acid for this purpose; but any combination or mixture of combinations of the inorganic bodies before mentioned may be advantageously used in order to break the continuity of the waterproofing film, and thus render the paper more absorbent to writing and printing media.

In order to carry out this part of my invention, I take the ordinary gelatine size, (but any other sizing agent may be employed as a substitute,) and having ascertained the amount of dry glutinous matter therein contained, I take an equal weight of the aforesaid inorganic preparation or preparations, either alone or mixed with precipitated glutinous matter, and cause it or them to be intimately blended with the size. This should be done at a temperature of about 120° Fahrenheit, and when the whole is thoroughly incorporated it is ready for use.

Care must be taken to prevent the earthy body from subsiding in the size, or the paper will be unequally coated with it. An intimate and uniform mixture may be maintained by using what is known as a "hog" kept briskly revolving in the size-vat or finishing-vessel; or other known means may be resorted to in order to maintain the necessary agitation requisite for producing a uniform result.

Having now fully described the nature of this my said invention and in what manner the same is to be performed, I would have it clearly understood that I do not confine myself to the precise details herein described, as the same might be varied without departing from the general principle of this my said invention, and I do not claim the exclusive use of these before-mentioned inorganic compounds, unless they have been dissolved and precipitated from such solutions as hereinbefore set forth; but

What I claim as my invention, and desire to secure by Letters Patent, is—

1. The use of compounds prepared by precipitation from watery or other solutions of the earths and acids before mentioned to consolidate and harden paper.

2. The use of chloride or oxychloride of zinc with glutinous matter as a size for paper.

3. The use of any of the before-mentioned prepared inorganic bodies mixed with the sizing agent to facilitate the absorption of writing and printing ink.

In witness whereof I, the said JOHN LOUIS JULLION, have hereunto set my hand and seal this 5th day of May, in the year of our Lord 1859.

JOHN LOUIS JULLION. [L. S.]

Witnesses:
JAMES THOMPSON,
JOHN BLACK.